Nov. 10, 1959 R. W. HUGHES 2,912,506

COMMUNICATION SYSTEM

Filed March 9, 1955 4 Sheets-Sheet 1

INVENTOR
ROBERT W. HUGHES
BY Alfred C. Hill
AGENT

Nov. 10, 1959 R. W. HUGHES 2,912,506

COMMUNICATION SYSTEM

Filed March 9, 1955 4 Sheets-Sheet 2

INVENTOR
ROBERT W. HUGHES
BY Alfred C. Hill
AGENT

INVENTOR
ROBERT W. HUGHES
BY Alfred C. Hill
AGENT

INVENTOR
ROBERT W. HUGHES
BY Alfred C. Hill
AGENT

United States Patent Office
2,912,506
Patented Nov. 10, 1959

2,912,506

COMMUNICATION SYSTEM

Robert W. Hughes, Mountain Lakes, N.J., assignor to International Telephone and Telegraph Corporation, Nutley, N.J., a corporation of Maryland Application March 9, 1955, Serial No. 493,103
20 Claims. (Cl. 179—15)

This invention relates to multichannel pulse communication systems and more particularly to novel compandor circuitry for utilization in pulse time or position modulation (PTM) multichannel communication systems.

When communication systems transmit voice channels, the effective signal-to-noise ratio is affected by the various talking levels encountered. The importance of this factor can be appreciated when it is noted that the dynamic range of an individual's voice is about 40 db and the range between the loudest and softest voice is about 30 db. Considered together, the difference in level between the loudest syllable of the loudest voice and the softest syllable of the softest voice is approximately 70 db.

This variation in signal strength means that a louder voice would have a better signal-to-noise ratio than a soft voice. Thus, communication systems must be designed to provide the minimum acceptable signal-to-noise ratio not only for full modulation, but also for the lower modulation provided by the soft speaking individuals. If it were possible to reduce the wide deviation of signals, or in other words, to compress this range of speech power, then the requirements for the communication system could be correspondingly reduced. This compression of the speech signals before exposure to the system noise is the basic idea of a compandor. Having compressed the speech before transmission it is then necessary to restore it after transmission to its original form, or, in other words, to expand it. The two operations then consist of a compressor and an expander and from these two words is derived the word "compandor" to designate the complete operation.

Prior art compandors, operating on the original audio modulation signal, or resultant pulse amplitude modulated signals, have provided a signal-to-noise improvement of approximately 20 db. The importance of this improvement in signal-to-noise ratio may be appreciated by noting that in a radio relay system a greater distance between repeaters would be permitted and, hence, the elimination of one or more repeater stations in long systems with a resulting saving of many thousands of dollars. In a wire system, it would permit greater spacing of repeater amplifiers with the corresponding monetary saving.

There are two basic types of compandors; namely, the syllabic type and the instantaneous type. In the past, the great majority of compandors have been of the syllabic type. Since they are used on the individual audio voice channels, one each for the plurality of channels is utilized in the communication system. The syllabic type of compandor acts on the signal in response to a control circuit which incorporates a carefully selected time constant. The time constant is usually of the order of 3 to 5 milliseconds for the attack and 30 to 50 milliseconds for the recovery. The necessity of these time constants follows from the fact that a strong sine wave, for example, would be compressed more like a square wave by an instantaneous compressor, and this in turn, would greatly increase its frequency content.

The PTM compandor of this disclosure is of the instantaneous type which will permit one compandor to operate upon the several communication channels contained within the multichannel communication system. The instantaneous type of compandor operates on the signal amplitude without regard to past signals. It follows from the above that instantaneous types of compandor arrangements are most useful in time division multiplex systems where each channel already uses a large bandwidth and the increase in bandwidth caused by the compandor action is of no significance.

It is an object of this invention to provide a circuit for utilization in multichannel communication systems to change the degree of time modulation of time modulated channel pulse signals for signal-to-noise ratio improvement in such systems.

It is another object of this invention to provide a compandor of the instantaneous type for PTM multichannel communication systems for sequential operation upon the time modulation or deviation of each channel pulse signal of a multiplexed PTM pulse train signal.

A further object of this invention is the provision of a plurality of compressors, each of said compressors operating on a pulse train signal including a plurality of wide deviation time modulated signal channels such that the compressed output of each of said compressors may be interleaved to appreciably increase the number of channels transmitted through the propagation medium without a corresponding increase in transmission bandwidth.

A feature of this invention is to provide a delay circuit having a delay characteristic linearly related to an input voltage. The delay circuit is activated sequentially by a train of time modulated pulse signals having a given time base to produce delayed output pulse signals. A generator producing a special waveform in synchronism with the time base of the time modulated pulse signals is coupled to the delay circuit to modify the delay characteristics thereof to determine the degree of delay of the output pulse signals and, hence, the compression or expansion of the degree of time modulation of the time modulated pulse signals. Whether the degree of time modulation is compressed or expanded depends upon the characteristic of the special waveform of the waveform generator.

Another feature of this invention is to provide a monostable cathode-coupled type of multivibrator activated from its steady state squentially by a train of PTM channel pulses. The length of time for the return of the multivibrator to its steady state determines the normal delay characteristic thereof. The time for return to the steady state condition after activation by an individual channel pulse is modified by the output of a special waveform generator coupled to one of the control grids of the electron discharge devices therein for sequential compression of the degree of time modulation of the individual PTM channel pulses when the output of said waveform generator has one given characteristic and for sequential expansion of the degree of time modulation of the individual PTM channel pulses when the output of said waveform generator has another given characteristic.

Still another feature of this invention is the provision of a non-linear feedback circuit in conjunction with an amplifier stage including therein diode type devices for modifying the shape of a sawtooth waveform to generate the special waveforms for control of the delay multivibrator delay characteristics.

A further feature of this invention is to provide an arrangement for increasing the number of wide deviation signal channels in a PTM communication system without a corresponding increase in transmission bandwidth. A plurality of channel groups, each channel group including a plurality of signal channels are provided at the transmitting portion of the system. A compressor of the delayed multivibrator type above described is incorporated to operate on each channel group to compress the degree of time modulation of the individual channel time modulated pulse signal and thereby expand the spacing between the individual channels of the channel groups. The outputs of the compressors are appropriately delayed and interleaved in time to provide an increase in the number of signal channels transmitted through the propagation medium in substantially the same bandwidth occupied by one of the uncompressed channel groups. The interleaved channel groups are appropriately separated and the degree of time modulation of the time modulated signals therein are operated on by the appropriate channel group expander to return the channel pulse signals to their original time deviation.

The above-mentioned and other features and objects of this invention will become more apparent by reference to the following description taken in conjunction with the accompanying drawings, in which.

Figure 1:
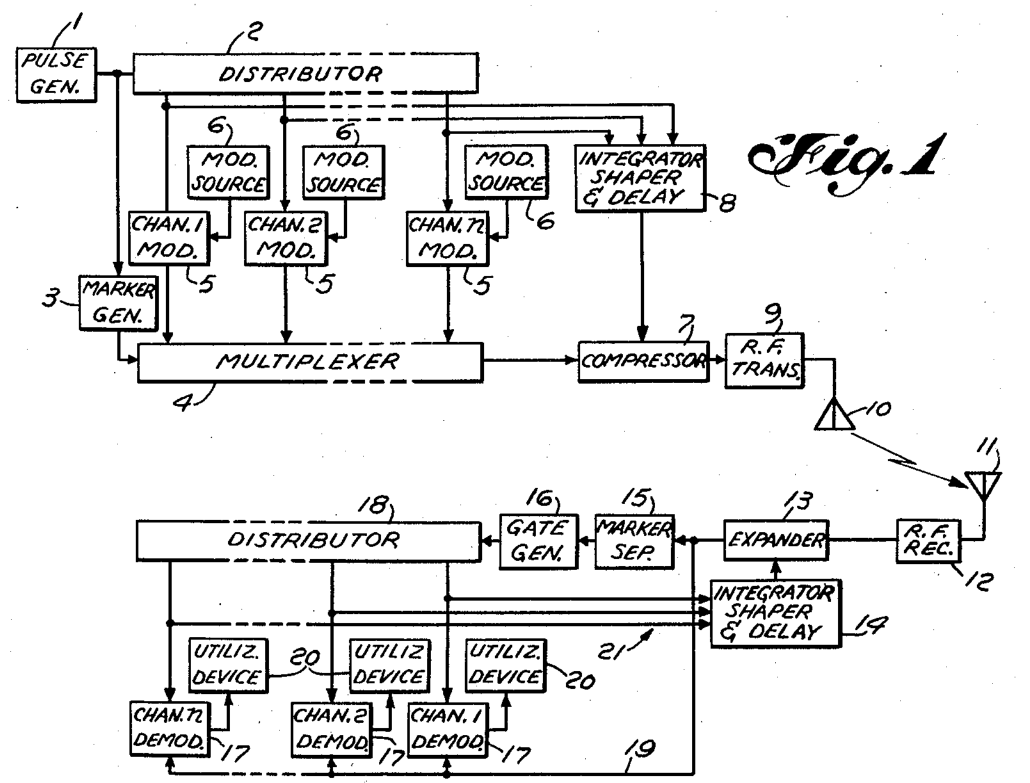
Fig. 1 is a block diagram of a multichannel PTM communication system untilizing the compandor of this invention.

Referring to Fig. 1, a multichannel PTM pulse communication system is illustrated in block form as comprising a pulse generator 1 supplying gate pulses to distributor 2 and marker generator 3, at a particular repetition frequency to establish a given time base for the time modulated channel pulse signals. The output of marker generator 3, for instance, a double pulse type synchronizing signal, is coupled to multiplexer 4. The circuitry employed in generator 3 to form the double pulse marker signal may have the configuration of the marker generator illustrated in U.S. Patent No. 2,485,591 to D.D. Greig. It is to be understood that other types of synchronizing signals may be employed in conjunction with the system herein described. The distributor 2 may take the form of a delay line of sufficient length having therealong a time sequence of output taps appropriately spaced to determine the time spacing between adjacent channel pulses and the unmodulated time position thereof. The gate pulses at the output of the distributor taps are coupled to their associated channel modulators 5. The channel modulators may take the form of the modulator disclosed in the above cited patent, or any other well-known time or pulse position modulation device which causes a variation of the time positioning of the channel pulse in accordance with the modulation signal. The modulation signal will be provided by modulation sources 6 which may include, for example, microphones, telephones, or Teletype equipment. The channel pulse modulated outputs of modulators 5 are coupled to the multiplexer 4 wherein they are time interleaved with one another and the marker or synchronizing signal of generator 3 to form a pulse train of energy.

Figure 2:
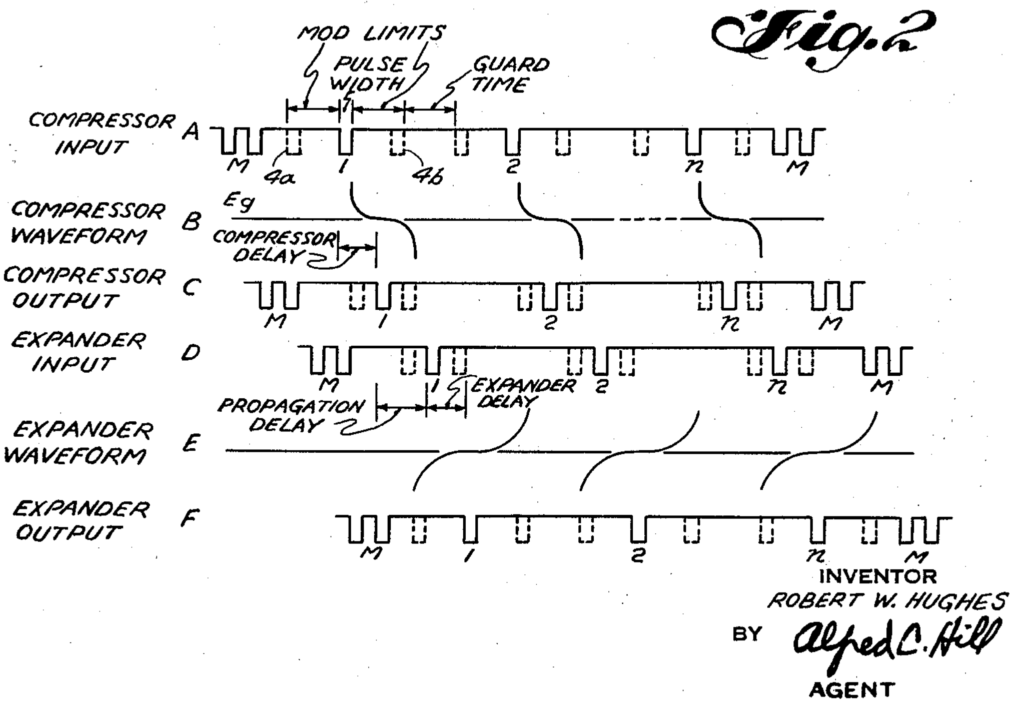
Fig. 2 illustrates a series of curves useful in explaining the operation of the system of Fig. 1.

The output of multiplexer 4, as illustrated in curve A of Fig. 2, is coupled to the input of compressor 7 which functions to compress the deviation or degree of time modulation of the channel pulses, the usual maximum deviation being as indicated by the dotted pulses 4*a* and 4*b* of channel No. 1. Compressor 7 includes as components thereof a delay circuit and a special waveform generator in synchronism with the time base of the channel pulse signals. The delay circuit is activated by the channel pulses to produce a delayed output pulse signal. The degree of delay of the output pulse is determined and controlled by the characteristic of the output of the special waveform generator. The output of the generator, as illustrated in curve B of Fig. 2, is derived from the gate pulses delivered by distributor 2 through circuit 8. Circuit 8 integrates and shapes the gate pulse to provide a portion thereof with a sawtooth configuration having a duration equivalent to at least the overall maximum deviation desired in the resultant compressed time modulated pulse signal. Circuit 8 further imparts a delay to the sawtooth portion equivalent to the nominal delay of the delay circuit to cause a time coincidence between the central point of the sawtooth portion and, hence, the special waveform of curve B and the unmodulated position of the delayed channel pulse signals. The resultant compressed output is graphically illustrated in curve C of Fig. 2. Compressor 7 operates to compress the modulation deviation of the channel pulses and in effect expands the spacing between adjacent channels which enables in certain applications to increase the number of channel signals for transmission in a given transmission bandwidth. The detailed operation of compressor 7 is described hereinafter in conjunction with Figs. 4 and 5.

The output of compressor 7 is coupled to radio frequency transmitter 9 for propagation via antenna 10 to antenna 11 and, hence, to the radio frequency receiver 12. The propagated radio wave is detected therein for recovery of the pulse train energy. It is to be understood that the medium of transmission and the method of transmitting the pulse train from one point to another is not limited to a radio wave or wireless transmission, but that a wire type transmission may be employed.

The pulse train output of receiver 12 which may be reshaped to enhance the operation and accuracy of the channel separation and demodulation is coupled to expander 13. The reshaping of the received pulse train may be accomplished by the circuit disclosed in the above cited patent.

The input to expander 13, curve D of Fig. 2, is substantially identical to curve C but delayed therefrom by the time delay experienced in the propagation medium. To reestablish the channel signals of the pulse train of curve D to substantially the relationship illustrated in curve A, it is necessary to expand this pulse train. This expansion is accomplished by a delay circuit similar in nature to the delay circuit of compressor 7 under the control of a special waveform, curve E of Fig. 2, having a characteristic which is the reverse of the characteristic of the compressor waveform. As in compressor 7, the expander waveform, derived from the output of circuit 14 which is substantially the same as circuit 8, controls the delay characteristics of the delay circuit to return the modulation deviation to substantially that deviation present in the original output of multiplexer 4. The resultant expanded pulse train is illustrated in curve F of Fig. 2. In practice, it has been found desirable to compress the output of multiplexer 4 to one-third of the modulation deviation therein and to expand the compressed modulation deviation by a factor of three to return the pulse train to its original modulation deviation. To accomplish this, the duration of the expander waveform of curve E would be approximately three times greater than the duration of the compressor waveform of curve B.

The output of expander 13, Fig. 1, is coupled to the marker separator 15 for separation of the marker pulse from the pulse train to activate gate generator 16 for synchronism with generator 1. The output of generator 16 is utilized in distributing the channel pulses of the pulse train to the respective channel pulse demodulators 17 for appropriate intelligence recovery. The circuitry employed in marker separator 15 and gate generator 16 may be patterned after the corresponding circuits in the above-cited patent. The output of generator 16 is coupled to distributor 18 to produce a plurality of timed de-blocking or gate pulses, one each timed to separate and demodulate, in any acceptable known manner, its respective channel pulse in the pulse train coupled by means of conductor 19 to the plurality of channel demodulators 17. The resultant intelligence signal is coupled to the utilization devices 20. The gate pulse outputs of distributor 18 are further coupled via conductors 21 to circuit 14 to produce the sequential sawtooth waveforms which are modified in the generator of expander 13 to produce the special waveforms utilized therein to modify the delay characteristics of the delay circuit incorporated in expander 13.

Figure 3:
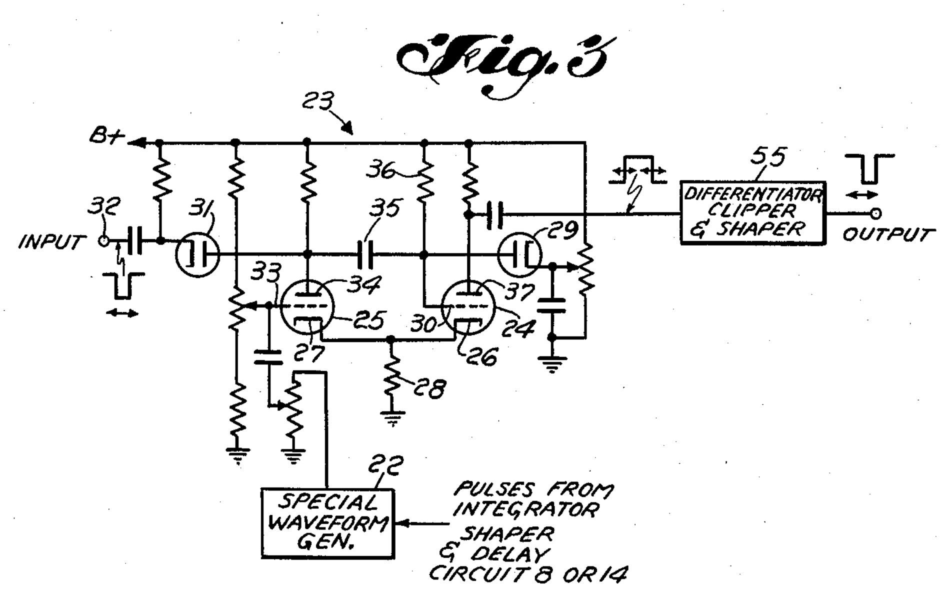
Fig. 3 is a schematic diagram, partially in block form, of the delay circuit employed as the compressor and expander of Fig. 1.

Referring to Fig. 3, there is illustrated the schematic of one form of circuit element which may be utilized as compressor 7 or expander 13 to perform the companding operation in accordance with this invention. Whether the circuit illustrated functions as a compressor or expander depends upon the output of the special waveform generator 22. An output waveform having a characteristic as illustrated in curve B, Fig. 2, will cause the delay circuit 23 to function as a compressor. If the waveform output of generator 22 has the characteristic as illustrated in curve E, Fig. 2, then the delay network 23 will function as an expander.

The delay circuit 23 basically is a cathode-coupled monostable multivibrator including electron discharge devices 24 and 25 whose cathodes 26 and 27 are coupled to a common cathode resistor 28. The stable state of the multivibrator occurs when device 24 is in a state of conduction and device 25 is in a state of non-conduction. The diode device 29 is used to define the initial level or bias of grid 30 of device 24. Without diode 29, the bias level of grid 30 would vary greatly according to the electrode structure and cathode emission of device 24. Diode 31 is provided to permit only negative pulses to pass therethrough for triggering the multivibrator. When a negative pulse, such as the channel pulse of a multiplexed pulse train, is applied to terminal 32 and passed through diode 31, device 24 is immediately made non-conductive and the cathode 27 of device 25 is dropped to within a few volts of grid 33 of device 25 thereby initiating conduction in device 25. A negative rectangle is thus generated at the anode 34 of device 25 and after differentiation in the timing network including condenser 35 and resistor 36, becomes the exponential timing waveform impressed on grid 30 of device 24. After a definite time interval, as established by the values of condenser 35 and resistor 36, the grid 30 crosses the cut-off of bias of device 24 and the multivibrator circuit reverts quickly to its stable state.

The preceding discussion neglected the modulation which may be impressed upon a channel pulse. With the channel pulse being modulated by a shifting of pulse position, the starting time of the delay multivibrator would be a function of the modulation signal since the multivibrator is triggered by the modulated channel applied through terminal 32. If the delay of the multivibrator were fixed, the stopping time would faithfully reproduce the starting time, but a fixed delay later.

To employ the circuit of Fig. 3 as a compressor, it should be remembered that the duration of the output pulse either from anode 34 or anode 37 is a linear function of the voltage impressed on grid 33 of device 25. Thus, it has been found that by inserting a special waveform on grid 33 the duration of the output pulse may be varied in a manner to effectively compress the degree of modulation of a time modulated channel pulse and thereby effect a compression of the original signal. This improves the signal-to-noise ratio of the system compared to an uncompressed signal with the same output deviation, and/or increases the number of channels transmitted in a given transmission bandwidth.

Figures 4, 5:
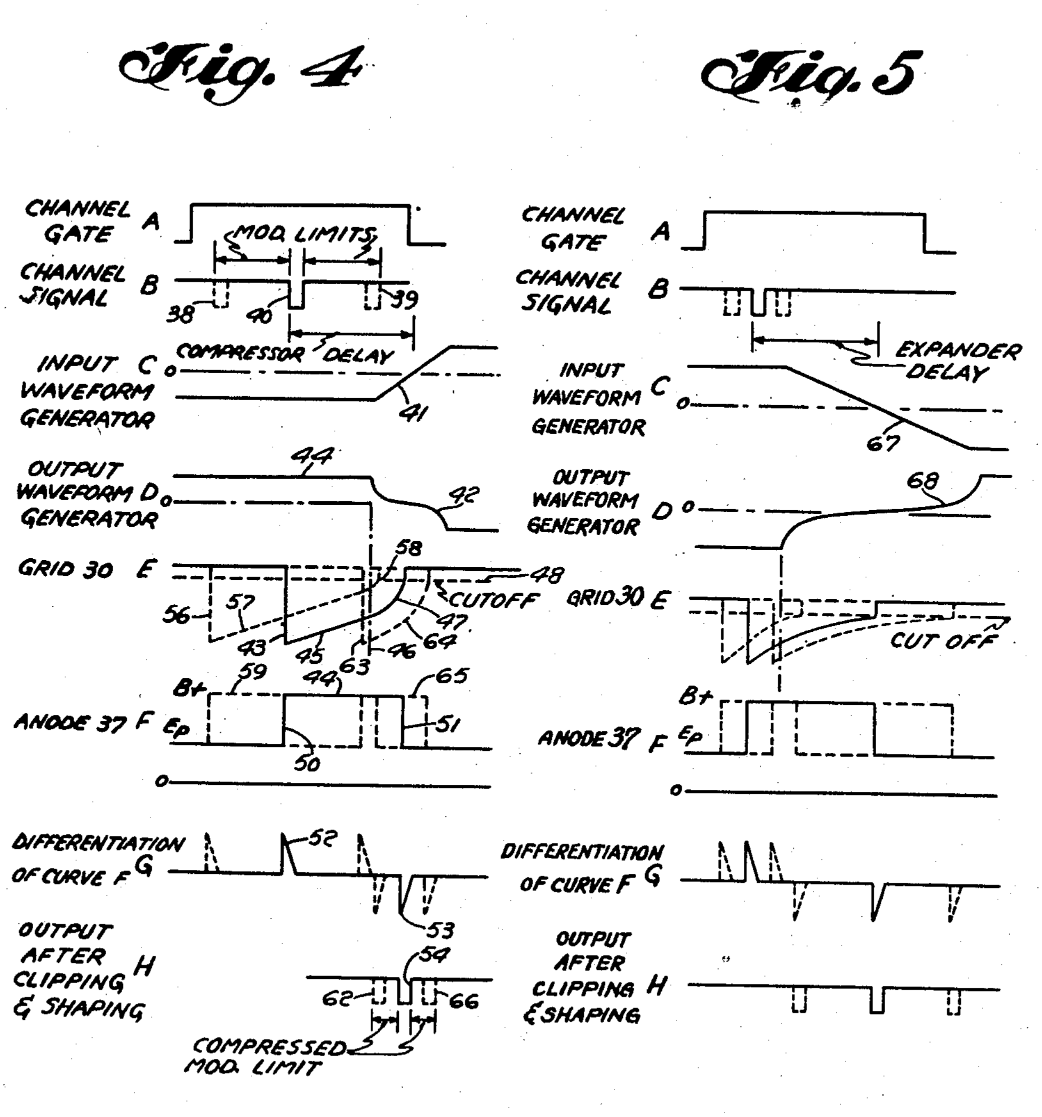
Figs. 4 and 5 illustrate a series of curves useful in explaining the operation of the circuit of Fig. 3 as a compressor and an expander, respectively.

Referring to Fig. 4, there is illustrated therein graphically the operation of the circuit of Fig. 3 as a compressor of time modulated pulse signals. A channel gate signal, curve A, is coupled from distributor 2 by an appropriate tap therealong to its corresponding modulator 5 to cooperate in producing a channel time modulated signal. The curve B illustrates by means of dotted pulses 38 and 39, the maximum time displacement for a channel signal from the unmodulated pulse 40. The gate signal of curve A is also coupled from the distributor tap to circuit 8 wherein the gate signal is integrated, shaped to provide a sawtooth segment 41 having a duration corresponding to the desired modulation limits of the compressed channel signal, and delayed an amount such that the central point thereof corresponds to the nominal delay present in compressor 7. The resultant output of circuit 8, as illustrated in curve C, is coupled to the waveform generator 22 of Fig. 3. Generator 22 inverts the polarity of the waveform of curve C and distorts the sawtooth segment 41 to produce therefrom a non-linear exponential segment 42 having a negative slope, as illustrated in curve D. Curve D represents the special waveform having the above desired characteristic which is applied to grid 33 of delay multivibrator 23 to control the delay characteristics thereof.

Having now outlined the production of the special waveform, the operation of delay multivibrator 23 will be described in conjunction therewith. As outlined hereinabove, device 24 is normally conducting and device 25 is normally non-conducting. Upon application of a channel pulse to terminal 32, the multivibrator is triggered from its stable state. If the channel pulse has the position of pulse 40, curve B, then the action of multivibrator will be as follows. The conductive conditions of devices 24 and 25 will immediately reverse and the potential on anode 34 will change simultaneously and instantaneously therewith, as indicated by segment 43 of curve E. The potential by which anode 34 and hence grid 30 changes will be controlled primarily by the bias on grid 33, as represented by segment 44 of curve D. This action initiates the delay action of multivibrator 23. The condenser 35 will then begin to charge along segment 45 of curve E at a rate determined by the value of condenser 35 and resistor 36. Grid 30 potential will continue to rise at this rate until such time as the exponential segment 42 of curve D becomes effective and the bias voltage of grid 33 begins to drop. Graphically this takes place as the time segment 45 crosses the vertical line 46. At this time the potential rise of grid 30 is speeded up as indicated by segment 47 of curve E. At the time segment 47 crosses the cut-off potential of device 24, as represented by line 48, the multivibrator immediately reverts to its stable condition. The action at grid 30 is reflected at anode 37 as indicated in curve F by the waveform 49, shown in solid lines. The leading edge 50 represents the triggering of circuit 23 by the channel pulse 40 and the trailing edge 51 represents the return of circuit 23 to its stable condition. The duration of pulse 49 corresponds to the nominal delay of circuit 23. Pulse 49 is then differentiated, as indicated by pips 52 and 53 of curve G, and then clipped and shaped to produce the useful pulse 54 of curve H. The differentiation, clipping and shaping is accomplished in circuit 55 of Fig. 3.

Having considered the operation of circuit 23 on a channel pulse disposed at the unmodulated position of curve B, let us turn now to the operation when the channel pulse occurs in a modulated position. Consider pulse 38. When pulse 38 is applied to terminal 32, grid 30 immediately changes as indicated by segment 56 of curve E. The potential to which grid 30 drops will be substantially identical with previous situations as indicated in curve E. Condenser 35 will immediately begin to charge along segment 57 until the voltage represented by segment 42 of curve D accelerates the potential rise of grid 30 as indicated by segment 58. This produces a pulse 59 at anode 37 whose duration is greater than the duration of pulse 49. The pulse 59 is then operated on by circuit 55 of Fig. 3 to produce the pulse 62 which is the compressed counterpart of pulse 38. If the pulse 39 were applied to terminal 32, the potential of grid 30 would be immediately dropped to the same potential as described with reference to pulses 38 and 40. This is illustrated by segment 63 of curve E. The charging of condenser 35 is almost immediately modified by the segment 42 of curve D, as illustrated by segment 64 of curve E. This results in pulse 65 at anode 37 which is operated on by circuit 55 to produce pulse 66, the compressed counterpart of pulse 39. Thus, as illustrated in curves E and F, the delay characteristics of circuit 23 have been modified by the special waveform of curve D to accomplish a compression of the degree of modulation of the channel signal.

The operation above described utilized the circuit of Fig. 3 as a compressor of time modulated pulse signals. To employ this circuit as an expander of time modulated pulse signals, the characteristic of the output of generator 22 is changed, otherwise the operation of circuit 23 is substantially identical with the above description taking into consideration the bias voltage applied to grid 33 from generator 22. The sequence of operation of circuit 23 is illustrated graphically in Fig. 5 when operating as an expander. Briefly, the input to generator 22 is derived in circuit 14, Fig. 1, from the channel gate signal coupled thereto from distributor 18. As will be observed the duration of the sawtooth segment 67 of curve C, Fig. 5, is at least as great as the desired expanded channel deviation. The generator 22 functions to distort segment 67 of curve C to produce the non-linear exponential segment 68 of curve D having a positive slope. The special waveform of curve D modifies the delay characteristics of circuit 23 in the manner graphically depicted in curves E, F and G much in the same manner as described with reference to curves E, F and G of Fig. 4 to produce the expanded time modulated pulse signal of curve H, Fig. 5. It will be noticed that the action of the special waveform of curve D is to slow down the potential rise of grid 30 in the manner depicted in curve E.

Figure 6:
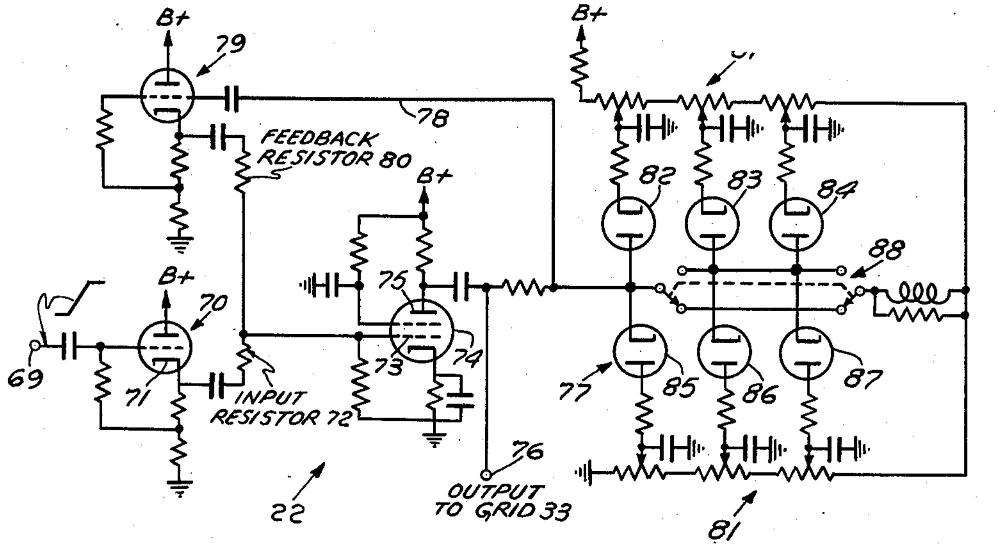
Fig. 6 is a schematic diagram of one form of the special waveform generator of Fig. 3.

The circuit of Fig. 6 illustrates one form of the special waveform generator 22. The operation of special waveform generator is synchronized by pulses derived from the distributor and operated thereon by the circuits 8 and 14 at either the transmitting or receiving equipment of the communication system of Fig. 1. It is necessary that the sawtooth input be in proper time relation with the channel pulse to assure sequential compression or expansion of a multiplexed pulse train in the same circuit. The symmetrical sawtooth waveform, such as illustrated in curve C of Figs. 4 or 5, is applied to terminal 69 for application to the cathode follower 70. The output of cathode follower 70 is coupled from the cathode 71 and applied by means of input resistor 72 to the grid 73 of the amplifier discharge device 74. The anode 75 of amplifier 74 has coupled thereto the output terminal 76 and a non-linear feedback path including diodes 77, conductor 78, cathode follower 79 and feedback resistor 80. This non-linear feedback circuit in conjunction with amplifier 74 enables a segmented approximation of the compressor or expander characteristic curve.

In the quiescent condition, diodes 77 are non-conducting and, therefore, the feedback is a maximum and the gain of device 74 is a minimum. The threshold condition of diode 77 is established by the B+ supply and the voltage divider 81. The voltage divider 81 and the diodes 77 are so arranged that diodes 82, 83 and 84 become successively conductive when the sawtooth voltage achieves certain given positive potentials from the symmetrically zero or reference voltage thereof and diodes 85, 86 and 87 become successively conductive when the sawtooth voltage achieves certain given negative potentials from the symmetrical reference voltage thereof. It will be apparent from the arrangement of the voltage divider 81 that diode 84 will conduct when the sawtooth voltage achieves a first given voltage, depending on the bias voltage of the diode, then diode 83 will conduct when the sawtooth voltage reaches a second more positive voltage, and diode 82 will conduct when the sawtooth voltage reaches a third more positive voltage at which time all diodes will then be conductive. The ganged switch 88 enables the selection of one positive and one negative conducting diode or three positive and three negative conducting diodes depending upon the closeness of approximation desired from the generator circuit to the theoretical compressor or expander characteristic.

When considering the amplitude of the sawtooth waveform in close proximity to the symmetrical point thereof, the feedback will be maximum and the gain of device 74 will be a minimum. Thus, at terminal 76 the slope of the output wave will be substantially equal to the slope of the sawtooth wave about this symmetrical point. The bias voltage on the various diodes are so adjusted that with a known amplitude and slope of input signal to generator 22 the diodes will become conductive at selected time points along the sawtooth wave with respect to the center or symmetrical point thereof. Thus, as the diodes 77 become successively conductive, the gain of amplifier 74 is increased as the feedback is decreased by the conduction or clipping action of diodes 77. The combined result is an output waveform closely approximating the desired compression or expansion characteristic of curve D, Figs. 4 or 5.

Figure 7:
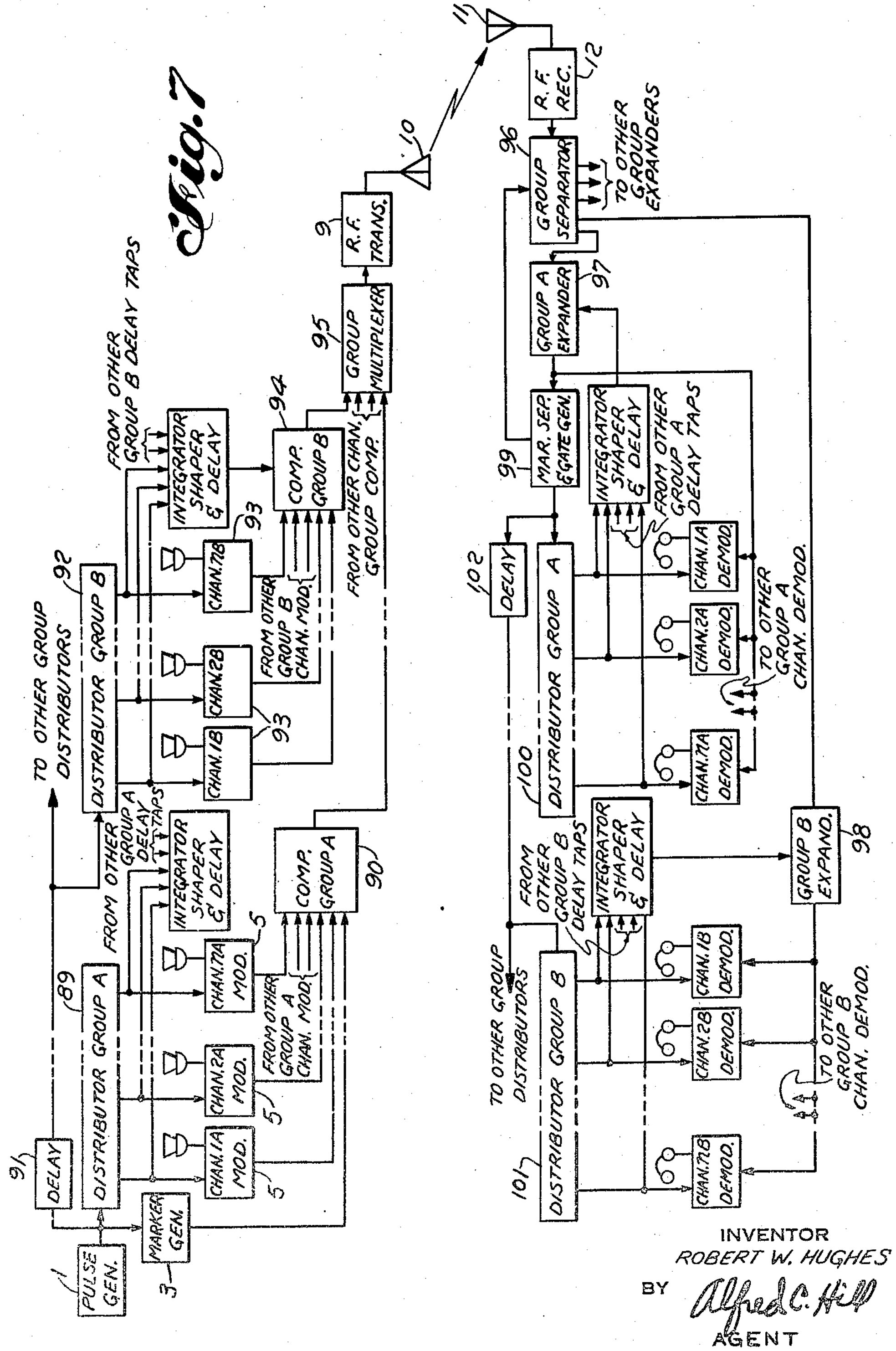
Fig. 7 is a block diagram of a multichannel PTM communication system utilizing the compandor of this invention to increase the number of signal channels occupying a given transmission bandwidth.

Referring now to Fig. 7, there is illustrated therein the utilization of the compandor of this invention for increasing the number of channel signals which may be transmitted within a given transmission bandwidth. The transmitting equipment primarily includes a plurality of certain of the equipments illustrated in Fig. 1, with like components being designated herein with the same reference character as utilized in Fig. 1. The output of pulse generator 1 is coupled to distributor 89 and marker generator 3. The gate pulses delivered by distributor 89 will enable the production of a plurality of wide deviation PTM channels, referred to herein as channel group A, which will occupy a transmission bandwidth of a given width. The outputs of channel modulators 5 will be coupled to a group A compressor 90 which operates in the manner described with reference to Fig. 3 to compress the channel deviation and as a result thereof expand the spacing between adjacent channels, as illustrated in curve C of Fig. 2.

A third output from pulse generator is coupled through an appropriate delay circuit 91 to other group distributors as represented by distributor 92. The sequentially timed gate outputs therefrom control modulators 93 to produce a second group of wide deviation channel pulses which are coupled to the group B compressor 94. The function of compressor 94 is to compress the deviation of the individual channels as described in connection with Fig. 3 and to expand the spacing between adjacent channels. The outputs of the compressors 90 and 94 and other channel group compressors which may be incorporated in the equipment are coupled to a group multiplexer 95 which functions to time interleave the pulse trains of the separate channel groups such that the several channel groups will occupy substantially the same bandwidth as would normally be occupied by any one of the channel groups.

The multiplexed channel groups are transmitted by transmitter 9 and antenna 10 to a receiving antenna 11 and receiver 12. The output of receiver 12 is coupled to group selector 96 wherein the separate channel groups are applied to their appropriate group expanders 97 and 98 to expand their corresponding channel group pulse train signals in a manner to return the channel pulses to the original wide deviation modulation. An output from the marker separator and gate generator 99 is utilized in group separator 96 to appropriately aid in gating or separating the received signal into their corresponding channel groups. The usual output from gate generator 99 is coupled to group A distributor 100 and group B distributor 101 with the latter distributor being activated through a delay 102 corresponding to the delay imparted by delay 91 in the transmitting equipment. As in Fig. 1, the channel demodulators function to separate their corresponding channels from the channel group for recovery of intelligence.

The delay 91 of the transmitting equipment is necessary to appropriately delay the output of pulse generator 1 for cooperation with multiplexer 95 to properly interleave the channel pulse groups in the expanded adjacent channel guard time. The delay 102 in the receiving equipment is likewise employed to bring about the proper timing for channel separation within the channel groups.

While I have described above the principles of my invention in connection with specific apparatus, it is to be clearly understood that this description is made only by way of example and not as a limitation to the scope of my invention as set forth in the objects thereof and in the accompanying claims.

I claim:

1. A circuit to change the amount of time modulation of a time modulated pulse signal in accordance with a given characteristic of a special waveform comprising a source of time modulated pulse signals having a given time base, a delay circuit, means coupling the time modulated pulse signals to said delay circuit to produce delayed output pulse signals, means to generate said special waveform in synchronism with the time base of said pulse time modulated signals, and means to couple the output of said means to generate said special waveform directly to said delay circuit to control the operation thereof to adjust the amount of delay of said output pulses in accordance with the given characteristic of said special waveform.

2. A circuit to change the degree of time modulation of a time modulated pulse signal in accordance with a given characteristic of a special waveform comprising a source of time modulated pulse signals having a given time base, a delay circuit, means coupling the time modulated pulse signals to said delay circuit to produce delayed output pulse signals, means to generate said special waveform in synchronism with the time base of said pulse time modulated signals, and means to couple the output of said means to generate said special waveform directly to said delay circuit to control the operation thereof to determine the degree of delay of said output pulses in accordance with the given characteristic of said special waveform, said means to generate said special waveform including an exponential waveform generator to produce a non-linear exponential waveform having a negative slope, said exponential waveform controlling the operation of said delay circuit to compress the degree of delay of said output pulses.

3. A circuit to change the degree of time modulation of a time modulated pulse signal in accordance with a given characteristic of a special waveform comprising a source of time modulated pulse signals having a given time base, a delay circuit, means coupling the time modulated pulse signals to said delay circuit to produce delayed output pulse signals, means to generate said special waveform in synchronism with the time base of said pulse time modulated signals, and means to couple the output of said means to generate said special waveform directly to said delay circuit to control the operation thereof to determine the degree of delay of said output pulses in accordance with the given characteristic of said special waveform, said means to generate said special waveform including an exponential waveform generator to produce a non-linear exponential waveform having a positive slope, said exponential waveform controlling the operation of said delay circuit to expand the degree of delay of said output pulses.

4. A circuit to change the amount of time modulation of a time modulated pulse signal in accordance with a given characteristic of a special waveform comprising a source of time modulated pulse signals having a given time base, a delay circuit including two electron discharge devices and means interconnecting said discharged devices to provide a monostable, cathode-coupled multivibrator, means coupling the time modulated pulse signals to one of said electron discharge devices to produce at the other of said electron discharge devices delayed output pulse signals, means to generate said special waveform in synchronism with the time base of said pulse time modulated signals, and means to couple said special waveform to said one of said electron discharge devices to control the operation thereof to adjust the amount of delay of said output pulses in accordance with the given characteristic of said special waveform.

5. A circuit to change the degree of time modulation of a time modulated pulse signal in accordance with a given characteristic of a special waveform comprising a source of time modulated pulse signals having a given time base, a first electron discharge device having at least an anode, a cathode and a control grid, a second electron discharge device having at least an anode, a cathode and a control grid, an anode voltage supply source, a reference potential, a resistor coupled between said reference potential and the cathode of both said discharge devices, first means coupled between said reference potential and said anode supply to establish a bias voltage on the control grid of said first discharge device, second means coupled between said reference potential and said anode supply to establish a bias voltage on the control grid of said second discharge device, said first and second means providing a stable conduction condition of conduction in said second discharge device and non-conduction in said first discharge device, a resistance-capacitance time constant coupled between the anode of said first discharge device and said anode supply, means coupling the time modulated pulse signals to the anode of said first electron discharge device to trigger said first and second discharge devices into a conduction condition opposite to said stable conduction condition, means coupled between the junction of the resistance and capacitance of said time constant and the control grid of said second electron discharge device to control the time at which said first and second discharge devices revert to said stable conduction condition to produce at the anode of said second discharge device delayed output pulse signals, means to generate said special waveform in synchronism with the time base of said pulse time modulated signals, and means to couple said special waveform to the grid of said first discharge device to control the operation of said first discharge device and said time constant to determine the degree of delay of said output pulses in accordance with the given characteristics of said special waveform.

6. A circuit to change the degree of time modulation of a time modulated pulse signal in accordance with a given characteristic of a special waveform comprising a source of time modulated pulse signals having a given time base, a delay circuit including two electron discharge devices and means interconnecting said discharge devices to provide a monostable, cathode-coupled multivibrator, means coupling the time modulated pulse signals to one of said electron discharge devices to produce at the other of said electron discharge devices delayed output pulse signals, means to generate said special waveform in synchronism with the time base of said pulse time modulated signals, and means to couple said special waveform to said one of said electron discharge devices to control the operation thereof to determine the degree of delay of said output pulses in accordance with the given characteristic of said special waveform, said means to generate said special waveform including a means to produce a symmetrical sawtooth waveform in synchronism with the time base of said pulse time modulated signals, a means to delay the point of symmetry of said sawtooth waveform an amount equivalent to the nominal delay of said delay circuit, an amplifier stage including an electron discharge device having at least an anode, a cathode and a control grid, means coupling said delayed sawtooth waveform to the control grid of said amplifier discharge device, and a non-linear feedback path coupled between anode and control grid of said amplifier discharge device to control the gain thereof to modify said sawtooth waveform for production of said special waveform having a non-linear characteristic.

7. A circuit according to claim 6, wherein said feedback path includes a pair of amplitude limiting devices, one of said limiting devices being biased for conduction when the amplitude of said sawtooth waveform achieves a given positive value with respect to the amplitude of its point of symmetry and the other of said limiting devices being biased for conduction when the amplitude of said sawtooth waveform achieves a given negative value with respect to the amplitude of its point of symmetry.

8. A circuit according to claim 6, wherein said feedback path includes a plurality of amplitude limiting devices, certain of said limiting devices being biased successively higher for successive conduction as the amplitude of said sawtooth waveform achieves certain given positive values with respect to the amplitude of its point of symmetry and others of said limiting devices being biased successively higher for successive conduction as the amplitude of said sawtooth waveform achieves certain given negative values with respect to the amplitude of its point of symmetry.

9. A circuit to change the degree of time modulation of a time modulated pulse signal in accordance with a given characteristic of a special waveform comprising a source of time modulated pulse signals having a given time base, a first electron discharge device having at least an anode, a cathode and a control grid, a second electron discharge device having at least an anode, a cathode and a control grid, an anode voltage supply source, a reference potential, a resistor coupled between said reference potential and the cathode of both said discharge devices, first means coupled between said reference potential and said anode supply to establish a bias voltage on the control grid of said first discharge device, second means coupled between said reference potential and said anode supply to establish a bias voltage on the control grid of said second discharge device, said first and second means providing the stable conduction condition of conduction in said second discharge device and non-conduction in said first discharge device, a resistance-capacitance time constant coupled between the anode of said first discharge device and said anode supply, means coupling the time modulated pulse signals to the anode of said first electron discharge device to trigger said first and second discharge devices into a conduction condition opposite to said stable conduction condition, means coupled between the junction of the resistance and capacitance of said time constant and the control grid of said second electron discharge device to control the time at which said first and second discharge devices revert to said stable conduction condition to produce at the anode of said second discharge device delayed output pulse signals, means to generate said special waveform in synchronism with the time base of said pulse time modulated signals, and means to couple said special waveform to the grid of said first discharge device to control the operation of said first discharge device and said time constant to determine the degree of delay of said output pulses in accordance with the given characteristics of said special waveform, said means to generate said special waveform including a means to produce a symmetrical sawtooth waveform in synchronism with the time base of said pulse time modulated signals, a means to delay the point of symmetry of said sawtooth waveform an amount equivalent to the nominal delay of said delay circuit, an amplifier stage including an electron discharge device having at least an anode, a cathode and a control grid, means coupling said delayed sawtooth waveform to the control grid of said amplifier discharge device and a non-linear feedback path coupled between the anode and control grid of said amplifier discharge device to control the gain thereof to modify said sawtooth waveform for production of said special waveform having a non-linear exponential characteristic.

10. A generator for producing waveforms having predetermined non-linear amplitude versus time characteristics comprising a means to produce a sawtooth waveform symmetrically disposed above and below a reference axis, said sawtooth waveform having a substantially linear amplitude versus time characteristic, an amplifier stage including an electron discharge device having at least an anode, a cathode, and a control grid, means coupling said means to produce said sawtooth waveform to the control grid of said amplifier discharge device, and a feedback path coupled between the anode and control grid of said amplifier discharge device, said feedback path including means having a non-linear stepped characteristic to control the gain of said amplifier discharge device in a non-linear fashion to convert said sawtooth waveform into a waveform having a predetermined non-linear amplitude versus time characteristic.

11. A generator for producing waveforms having non-linear characteristics comprising a means to produce a symmetrical sawtooth waveform, an amplifier stage including an electron discharge device having at least an anode, a cathode, and a control grid, means coupling said means to produce said sawtooth waveform to the control grid of said amplifier discharge device, and a non-linear feedback path coupled between the anode and control grid of said amplifier discharge device to control the gain thereof to modify said sawtooth waveform for production of said waveform having a non-linear characteristic, said feedback path including a pair of amplitude limiting devices, biasing means to bias one of said limiting devices for conduction when the amplitude of said sawtooth waveform achieves a given positive value with respect to the amplitude of its point of symmetry and biasing means to bias the other of said limiting devices for conduction when the amplitude of said sawtooth waveform achieves a given negative value with respect to the amplitude of its point of symmetry.

12. A generator for producing waveforms having non-linear characteristics comprising a means to produce a symmetrical sawtooth waveform, an amplifier stage including an electron discharge device having at least an anode, a cathode, and a control grid, means coupling said means to produce said sawtooth waveform to the control grid of said amplifier discharge device, and a non-linear feedback path coupled between the anode and control grid of said amplifier discharge device to control the gain thereof to modify said sawtooth waveform for production of said waveform having a non-linear characteristic, said feedback path including a plurality of amplitude limiting devices, biasing means to bias certain of said limiting devices successively higher for successive conduction as the amplitude of said sawtooth waveform achieves certain given positive values with respect to the amplitude of its point of symmetry and biasing means to bias others of said limiting devices successively higher for successive conduction as the amplitude of said sawtooth waveform achieves certain given negative values with respect to the amplitude of its point of symmetry.

13. A communication system comprising a pulse train source including a plurality of time deviated channel pulses interleaved in time, a compressor circuit in synchronism with the channel pulses of said pulse train coupled to said source to compress in sequence the time deviation of each channel, transmitting means coupled to said compressor circuit for transmission of the compressed channel pulses, receiving means for receiving the transmitted channel pulses, an expander circuit in synchronism with the transmitted channel pulses coupled to said receiving means to expand in sequence the compressed time deviation of each channel to restore the original time deviation thereto, and means to extract from said restored channel pulses the intelligence carried thereby.

14. A communication system according to claim 13, wherein said compressor circuit includes a delay circuit including two electron discharge devices and means interconnecting said discharge devices to provide a monostable, cathode-coupled multivibrator, means coupling the channel pulses of said pulse train to one of said electron discharge devices to produce at the other of said electron discharge devices delayed output channel pulses, means to generate a special waveform having given characteristics in synchronism with the channel pulses of said pulse train, and means to couple said special waveform to said one of said electron discharge devices to control the operation thereof to determine the degree of delay of said output channel pulses in accordance with the given characteristics of said special waveform.

15. A communication system comprising a pulse train source including a plurality of time deviated channel pulses interleaved in time, a compressor circuit in synchronism with the channel pulses of said pulse train coupled to said source to compress in sequence the time deviation of each channel, transmitting means coupled to said compressor circuit for transmission of the compressed channel pulses, receiving means for receiving the transmitted channel pulses, an expander circuit in synchronism with the transmitted channel pulses coupled to said receiving means to expand in sequence the compressed time deviation of each channel to restore the original time deviation thereto and means to extract from said restored channel pulses the intelligence carried thereby, said compressor circuit including a first electron discharge device having at least an anode, a cathode and a control grid, a second electron discharge device having at least an anode, a cathode and a control grid, an anode voltage supply source, a reference potential, a resistor coupled between said reference potential and the cathode of both said discharge devices, first means coupled between said reference potential and said anode supply to establish a bias voltage on the control grid of said first discharge device, second means coupled between said reference potential and said anode supply to establish a bias voltage on the control grid of said second discharge device, said first and second means providing the stable conduction condition of conduction in said second discharge device and non-conduction in said first discharge device, a resistance-capacitance time constant coupled between the anode of said first discharge device and said anode supply, means coupling the channel pulses of said pulse train to the anode of said first electron discharge device to trigger said first and second discharge devices into a conduction condition opposite to said stable conduction condition, means coupled between the junction of the resistance and capacitance of said time constant and the control grid of said second electron discharge device to control the time at which said first and second discharge devices revert to said stable conduction condition to produce at the anode of said second discharge device delayed output channel pulses, means to generate a special waveform having given characteristics in synchronism with the channel pulses of said pulse train, and means to couple said special waveform to the grid of said first discharge device to control the operation of said first discharge device and said time constant to determine the degree of delay of said output channel pulses in accordance with the given characteristics of said special waveform.

16. A communication system according to claim 15, wherein said means to generate a special waveform includes a means to produce a symmetrical sawtooth waveform in synchronism with the channel pulses of said pulse train, a means to delay the point of symmetry of said sawtooth waveform an amount equivalent to the nominal delay of said delay circuit, an amplifier stage including an electron discharge device having at least an anode, a cathode and a control grid, means coupling said delayed sawtooth waveform to the control grid of said amplifier discharge device and a non-linear feedback path coupled between the anode and control grid of said amplifier discharge device to control the gain thereof to modify said sawtooth waveform for production of said special waveform having a non-linear exponential characteristic with a negative slope.

17. A communication system according to claim 13, wherein said expander circuit includes a delay circuit including two electron discharge devices and means interconnecting said discharge devices to provide a monostable, cathode-coupled multivibrator, means coupling the channel pulses of said pulse train to one of said electron discharge devices to produce at the other of said electron discharge devices delayed output channel pulses, means to generate a special waveform having given characteristics in synchronism with the channel pulses of said pulse train, and means to couple said special waveform to said one of said electron discharge devices to control the operation thereof to determine the degree of delay of said output channel pulses in accordance with the given characteristics of said special waveform.

18. A communication system comprising a pulse train source including a plurality of time deviated channel pulses interleaved in time, a compressor circuit in synchronism with the channel pulses of said pulse train coupled to said source to compress in sequence the time deviation of each channel, transmitting means coupled to said compressor circuit for transmission of the compressed channel pulses, receiving means for receiving the transmitted channel pulses, an expanded circuit in synchronism with the transmitted channel pulses coupled to said receiving means to expand in sequence the compressed time deviation of each channel to restore the original time deviation thereto, and means to extract from said restored channel pulses the intelligence carried thereby, said expander circuit including a first electron discharge device having at least an anode, a cathode and a control grid, a second electron discharge device having at least an anode, a cathode and a control grid, an anode voltage supply source, a reference potential, a resistor coupled between said reference potential and the cathode of both said discharge devices, first means coupled between said reference potential and said anode supply to establish a bias voltage on the control grid of said discharge device, second means coupled between said reference potential and said anode supply to establish a bias voltage on the control grid of said second discharge device, said first and second means providing the stable conduction condition of conduction in said second discharge device and non-conduction in said first discharge device, a resistance-capacitance time constant coupled between the anode of said first discharge device and said anode supply, means coupling the channel pulses of said pulse train to the anode of said first electron discharge device to trigger said first and second discharge devices into a conduction condition opposite to said stable conduction condition, means coupled between the junction of the resistance and capacitance of said time constant and the control grid of said second electron discharge device to control the time at which said first and second discharge devices revert to said stable conduction condition to produce at the anode of said second discharge device delayed output channel pulses, means to generate a special waveform having given characteristics in synchronism with the channel pulses of said pulse train, and means to couple said special waveform to the grid of said first discharge device to control the operation of said first discharge device and said time constant to determine the degree of delay of said output pulses in accordance with the given characteristics of said special waveform.

19. A communication system according to claim 18, wherein said means to generate a special waveform includes a means to produce a symmetrical sawtooth waveform in synchronism with the channel pulses of said pulse train, a means to delay the point of symmetry of said sawtooth waveform an amount equivalent to the nominal delay of said delay circuit, an amplifier stage including an electron discharge device having at least an anode, a cathode and a control grid, means coupling said delayed sawtooth waveform to the control grid of said amplifier discharge device and a non-linear feedback path coupled between the anode and control grid of said amplifier discharge device to control the gain thereof to modify said sawtooth waveform for production of said special waveform having a non-linear exponential characteristic with a positive slope.

20. A communication system comprising a plurality of pulse train sources, each of said pulse trains including a plurality of wide time deviated channel pulses occupying a given bandwidth and having a given time delay with respect to the other of said pulse trains, a plurality of compressor circuits, each of said compressor circuits coupled to one of said pulse train sources and in synchronism with the channel pulses thereof to compress in sequence the wide time deviation of each channel therein and simultaneously expand the spacing between adjacent channels, mixing means coupled to the output of each of said compressor circuits to time interleave the adjacent compressed channel pulses of certain of said pulse trains between adjacent compressed channel pulses of other of said pulse trains thereby increasing the number of channel pulses present in said given bandwidth, transmitting means coupled to said mixing means for transmission of the interleaved pulse trains, receiving means for receiving the transmitted pulse trains, separating means to separate the pulse trains from said interleaved pulse trains, a plurality of expander circuits coupled to said separating means, each of said expander circuits being responsive to one of the separated pulse trains to expand in sequence the compressed time deviation of the channel pulses therein to restore said wide time deviation thereto, and means to extract from the restored pulse trains the intelligence carried by each of said channel pulses.

References Cited in the file of this patent

UNITED STATES PATENTS

| | | |
|---|---|---|
| 2,445,775 | Grieg | July 27, 1948 |
| 2,454,792 | Grieg | Nov. 30, 1948 |
| 2,506,770 | Braden | May 9, 1950 |
| 2,529,564 | Miller | Nov. 14, 1950 |
| 2,541,076 | Labin et al. | Feb. 13, 1951 |
| 2,710,915 | Young | June 14, 1955 |
| 2,828,417 | Fleming et al. | Mar. 25, 1958 |

OTHER REFERENCES

Rider: Television Manual, vol. 10, TV page 10–14 RCA, circuit of RCA model 17 T150, January 1953.